(12) United States Patent
Lee et al.

(10) Patent No.: US 12,526,905 B2
(45) Date of Patent: Jan. 13, 2026

(54) CONTROL METHOD, DIMMING CONTROLLER, AND DISPLAY DEVICE

(71) Applicant: Beijing Xianxin Technology Co., Ltd, Beijing (CN)

(72) Inventors: Kiwon Lee, Beijing (CN); Jong Dae Kim, Beijing (CN); Youngjin Lim, Beijing (CN); Chenghui Yan, Beijing (CN)

(73) Assignee: Beijing Xianxin Technology Co., Ltd, Beijing (CN)

( * ) Notice: Subject to any disclaimer, the term of this patent is extended or adjusted under 35 U.S.C. 154(b) by 83 days.

(21) Appl. No.: 18/757,417

(22) Filed: Jun. 27, 2024

(65) Prior Publication Data

US 2024/0349414 A1  Oct. 17, 2024

Related U.S. Application Data

(63) Continuation of application No. PCT/CN2022/142116, filed on Dec. 26, 2022.

(30) Foreign Application Priority Data

Dec. 31, 2021  (CN) .......................... 202111649268.4

(51) Int. Cl.
*H05B 47/24* (2020.01)
*G09G 3/34* (2006.01)
*G02F 1/13357* (2006.01)

(52) U.S. Cl.
CPC ........... *H05B 47/24* (2020.01); *G02F 1/1336* (2013.01)

(58) Field of Classification Search
CPC ........ H05B 45/10; H05B 45/34; H05B 45/37; H05B 47/10; H05B 47/24; G09G 3/34;
(Continued)

(56) References Cited

U.S. PATENT DOCUMENTS

2011/0102475 A1  5/2011  Agarwal et al.
2015/0241891 A1*  8/2015  Lee .......................... H05B 47/20
315/127
(Continued)

FOREIGN PATENT DOCUMENTS

CN  101388183  3/2009
CN  201413625  2/2010
(Continued)

OTHER PUBLICATIONS

He, Jiangping et al., "Research Progress of White LED Backlighting Driver", Microelectronics, vol. 46, No. 4, Aug. 2016, with English abstract thereof, pp. 567-571.
(Continued)

*Primary Examiner* — Thai Pham
(74) *Attorney, Agent, or Firm* — JCIPRNET (57) ABSTRACT

A control method, a dimming controller, and a display device, the method including: acquiring a voltage state of each output channel of any number of drive units, where the voltage state includes an undervoltage state, an overvoltage state, and a steady state, and a voltage state of an output channel of each drive unit is determined by the drive unit according to a voltage of the output channel within preset time and a steady operation voltage range; and adjusting, according to the voltage state of each output channel of the any number of drive units, voltages of power supply terminals of all light-emitting units in the back light unit. This solution can reduce power loss of the display device and ensure display of pictures.

20 Claims, 5 Drawing Sheets

(58) Field of Classification Search
CPC ...... G09G 3/3406; G09G 3/36; G09G 3/3607; G09G 3/2003; G02F 1/1336; G02F 1/133602; G02F 1/133603
See application file for complete search history.

(56) References Cited

U.S. PATENT DOCUMENTS

| | | | |
|---|---|---|---|
| 2016/0029449 A1* | 1/2016 | Lee ................... | H05B 45/3725 315/307 |
| 2022/0322511 A1* | 10/2022 | Zhang ................. | G09G 3/3406 |

FOREIGN PATENT DOCUMENTS

| | | |
|---|---|---|
| CN | 102646402 | 8/2012 |
| CN | 109285508 | 1/2019 |
| CN | 209674847 | 11/2019 |
| CN | 112233627 | 1/2021 |
| CN | 112669778 | 4/2021 |
| CN | 112820243 | 5/2021 |
| CN | 113129846 | 7/2021 |
| CN | 113223450 | 8/2021 |
| CN | 113450730 | 9/2021 |
| CN | 114267302 | 4/2022 |
| TW | 200921597 | 5/2009 |

OTHER PUBLICATIONS

"International Search Report (Form PCT/ISA/210) of PCT/CN2022/142116," mailed on Feb. 22, 2023, with English translation thereof, pp. 1-7.

"Written Opinion of the International Searching Authority (Form PCT/ISA/237) of PCT/CN2022/142116," mailed on Feb. 22, 2023, with English translation thereof, pp. 1-7.

"Office Action of China Counterpart Application", issued on Apr. 27, 2022, with English translation thereof, p. 1-p. 15.

"Rejection Decision of China Counterpart Application", issued on Jun. 24, 2022, with English translation thereof, p. 1-p. 9.

"Notification to Grant Patent Right for Invention of China Counterpart Application", issued on Oct. 9, 2022, with English translation thereof, p. 1-p. 6.

* cited by examiner

CONTROL METHOD, DIMMING CONTROLLER, AND DISPLAY DEVICE

CROSS-REFERENCE TO RELATED APPLICATION

This application is a continuation of international PCT application serial no. PCT/CN2022/142116, filed on Dec. 26, 2022, which claims priority to Chinese patent application No. 202111649268.4, filed on Dec. 31, 2021. The disclosures of the aforementioned applications are hereby incorporated by reference in their entireties.

BACKGROUND

Technical Field

The present application relates to, but is not limited to, a control method, a dimming controller, and a display device.

Description of Related Art

With the development of technology, display devices have become an important part of many electronic devices, for example, a liquid crystal display (LCD).

A display device normally consists of a liquid crystal panel and a back light circuit. The back light circuit is located underneath the liquid crystal panel and is configured to provide a back light source for the liquid crystal panel. How to reduce power loss of the back light circuit without affecting data display of the display device has been a long-standing problem to be solved.

SUMMARY

Embodiments of the present application provide a control method, applied to a dimming controller, where a display device includes the dimming controller and a back light unit; each back light unit includes a plurality of drive units, one output channel of each of the drive units is connected to a control terminal of one light-emitting unit, and the method includes:
  acquiring voltage states of respective output channels of any number of drive units; where the voltage states include an undervoltage state, an overvoltage state, and a steady state; and a voltage state of an output channel of each drive unit is determined by the drive unit according to a voltage of the output channel within preset time and a steady operation voltage range; and
  adjusting, according to the voltage states of the respective output channels of the any number of drive units, voltages of power supply terminals of all light-emitting units in the back light unit.

In an embodiment, the adjusting, according to the voltage states of the respective output channels of the any number of drive units, the voltages of the power supply terminals of all the light-emitting units in the back light unit specifically includes:
  counting an output channel number corresponding to each voltage state, and determining, according to the output channel number corresponding to each voltage state and a priority of each voltage state, a voltage state of the back light unit; and
  adjusting, according to the voltage state of the back light unit, the voltages of the power supply terminals of all the light-emitting units in the back light unit.

In an embodiment, the determining, according to the output channel number corresponding to each voltage state and the priority of each voltage state, the voltage state of the back light unit specifically includes:
  when an output channel number corresponding to one voltage state is maximum, using the voltage state to which the maximum output channel number corresponds as the voltage state of the back light unit; and
  when output channel numbers corresponding to a plurality of voltage states are a maximum output channel number, selecting a voltage state with a higher priority from the plurality of voltage states to which the maximum output channel number corresponds as the voltage state of the back light unit;
  or
  selecting, from the voltage states, a voltage state corresponding to which an output channel number satisfies a critical condition as an alternative voltage state; and using an alternative voltage state with a highest priority as the voltage state of the back light unit.

In an embodiment, the power supply terminals of all the light-emitting units are connected to a common power supply terminal; and the adjusting, according to the voltage state of the back light unit, the voltages of the power supply terminals of all the light-emitting units in the back light unit specifically includes:
  adjusting, according to the voltage state of the back light unit, a voltage of the common power supply terminal, to realize adjustment of the voltages of the power supply terminals of all the light-emitting units in the back light unit.

In an embodiment, the display device further includes a voltage conversion module, the voltage conversion module being connected to the common power supply terminal; and the adjusting, according to the voltage state of the back light unit, the voltage of the common power supply terminal specifically includes:
  generating, according to the voltage state of the back light unit, an adjustment instruction, where the adjustment instruction is used for controlling the voltage conversion module to adjust the voltage of the common power supply terminal.

In an embodiment, the generating, according to the voltage state of the back light unit, the adjustment instruction, specifically includes:
  when the voltage state of the back light unit is an overvoltage state, generating a voltage reduction instruction; the voltage reduction instruction being used for controlling the voltage conversion module to reduce the voltage of the common power supply terminal;
  when the voltage state of the back light unit is an undervoltage state, generating a voltage increase instruction; the voltage increase instruction being used for controlling the voltage conversion module to increase the voltage of the common power supply terminal; and
  when the voltage state of the back light unit is a steady state, generating a holding instruction, where the holding instruction is used for controlling the voltage conversion module to hold the voltage of the common power supply terminal.

In an embodiment,
  for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

A dimming controller in another embodiment of the present application includes: a processor, and a memory communicatively connected to the processor;

where the memory stores a computer executable instruction; and the processor executes the computer executable instruction stored in the memory to implement the control method involved in the aforementioned embodiments.

An further embodiment of the present application provides a display device including the dimming controller provided in the aforementioned embodiments and a back light unit; where each back light unit includes any number of modules, each module including a plurality of drive units and a plurality of light-emitting units, and an output channel of each of the drive units being connected to a control terminal of one light-emitting unit; and each of the drive units is further connected to the dimming controller.

In an embodiment, the display device further includes a voltage conversion module, the voltage conversion module being connected to the dimming controller, and the voltage conversion module being further connected to a common power supply terminal, and power supply terminals of all light-emitting units are connected to the common power supply terminal.

To make the aforementioned more comprehensible, several embodiments accompanied with drawings are described in detail as follows.

BRIEF DESCRIPTION OF THE DRAWINGS

Drawings herein, which are incorporated into and form a part of the specification, show embodiments consistent with the present application and are used in combination with the specification to explain principles of the present application.

Specific embodiments of the present application have been shown by means of the aforementioned drawings, which will be described in greater detail in the following. These drawings and textual descriptions are not intended to limit scope of concepts of the present application in any way, but rather to illustrate the concepts of the present application for those skilled in the art by reference to particular embodiments.

DESCRIPTION OF THE EMBODIMENTS

Illustrative embodiments will be described herein in detail, examples of which are represented in the drawings. When a following description refers to the drawings, same numerals in different drawings represent same or similar elements unless otherwise indicated. Implementation modes described in following exemplary embodiments do not represent all implementation modes consistent with the present application. On the contrary, they are only examples of apparatuses and methods as detailed in the appended claims and consistent with some aspects of the present application.

A display device is an important component of many electronic devices, for example, a television configured with a display device, a monitor configured with a display device, etc. An embodiment of the present application provides a display device. The display device includes a cover plate, a liquid crystal panel, a back light structure, and a circuit board. The cover plate is located above the liquid crystal panel and is used for protecting the liquid crystal panel. The back light structure is located underneath the liquid crystal panel and is configured to provide a back light source for the liquid crystal panel, and the circuit board is connected to the liquid crystal panel and is configured to drive the liquid crystal panel so that the liquid crystal panel displays different contents.

Figure 1:
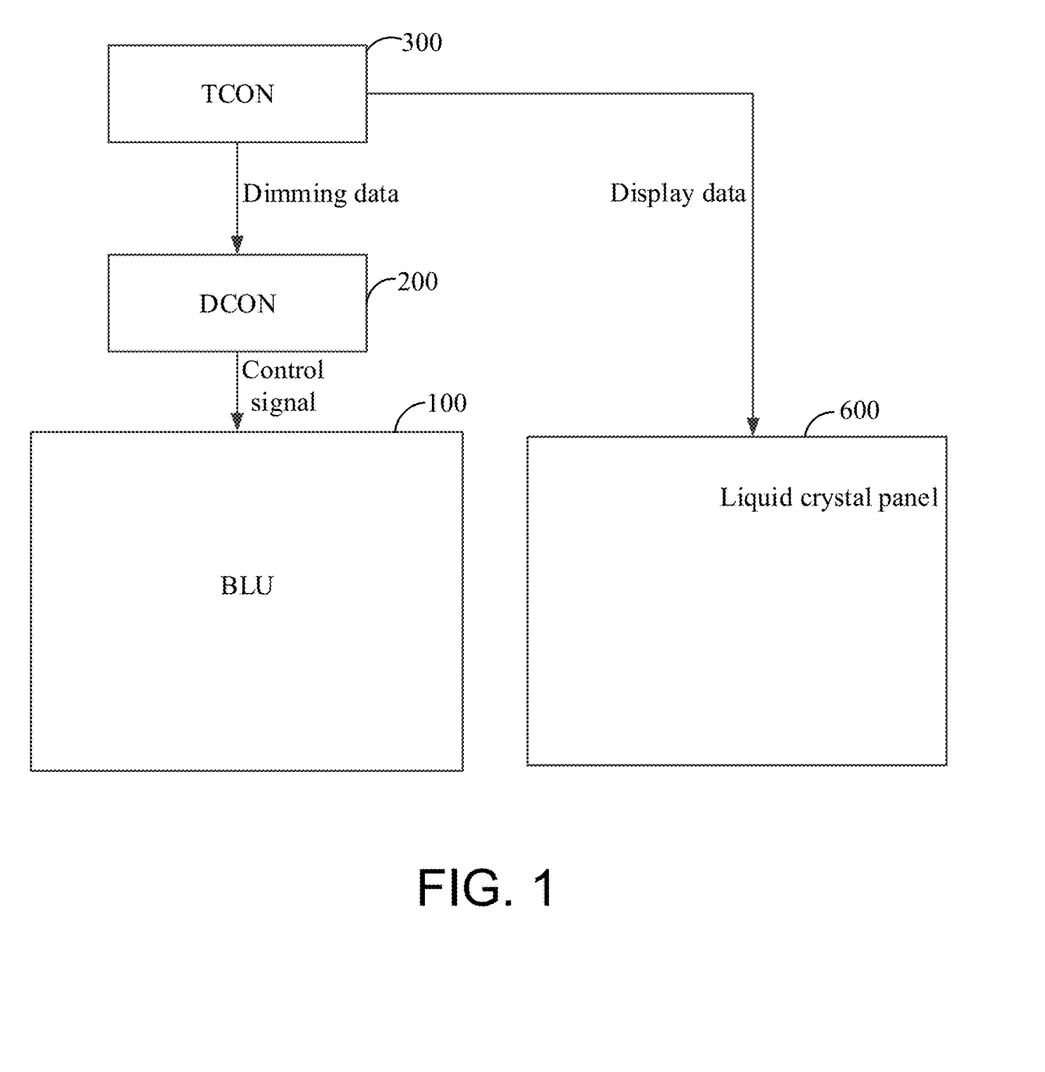
FIG. 1 is a structural diagram of a display device provided in an embodiment of the present application.
Figure 2:
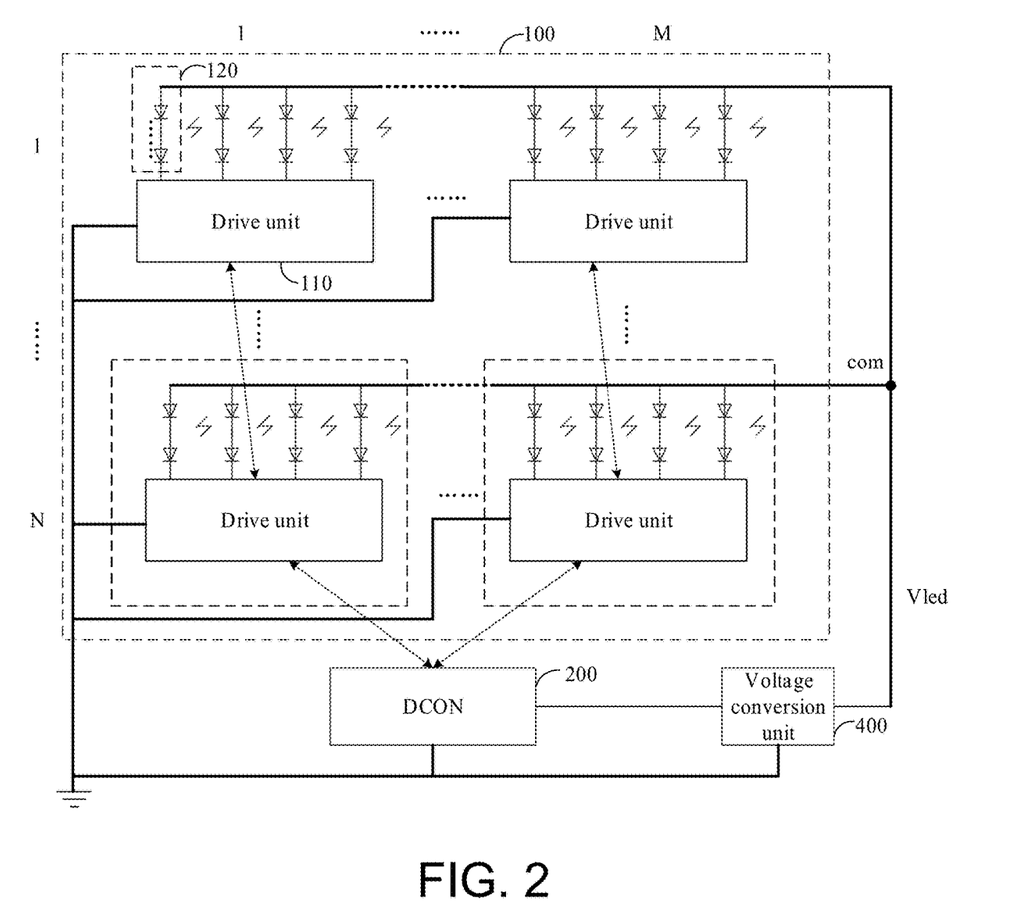
FIG. 2 is a schematic circuit diagram of a display device provided in another embodiment of the present application.

As shown in FIG. 1 and FIG. 2, a display device includes a dimming controller 200 (DCON), a timing controller 300 (TCON), a back light unit 100 (BLU), and a liquid crystal panel 600. The dimming controller 200 generates a control signal according to dimming data output from the timing controller 300, the control signal being used for controlling a drive unit 110 in the back light unit 100 to generate a drive signal. The drive unit 110 provides the drive signal to a light-emitting unit 120, and the drive signal can control light-emitting brightness of the light-emitting unit 120, thereby providing back light of different brightness.

The following description focuses on a back light structure in the display device, and the back light structure normally includes a reflective film, an astigmatism film, and a back light unit 100. The back light unit 100 is configured to provide back light, and the reflective film and the astigmatism film are used for making light provided by the light-emitting unit 120 more evenly distributed.

As shown in FIG. 2, the back light unit 100 includes any number of modules, where each module includes a plurality of drive units 110 and a plurality of light-emitting units 120, the plurality of drive units 110 being distributed in an array, for example, in an M×N array. The figure only shows a drive unit 110 in the first row and first column, a drive unit 110 in the first row and Mth column, a drive unit 110 in the Nth row and first column, and a drive unit 110 in the Nth row and Mth column. Each of the drive units 110 is connected to a plurality of light-emitting units 120. A drive unit 110 is provided with a plurality of output channels, each output channel being connected to a control terminal of one light-emitting unit 120, a power supply terminal of each light-emitting unit 120 is connected to a power supply Vled, and the drive unit 110 is configured to provide drive signals for light-emitting units 120. For example, a light-emitting unit 120 includes a plurality of light-emitting diodes connected in series, and an anode of a light-emitting diode located at a head end serves as a power supply terminal of the light-emitting unit 120 and is used for connecting to a power supply Vled. A cathode of a light-emitting diode located at a tail end serves as a control terminal of the light-emitting unit 120 and is for connecting to a drive unit 110.

Continuing to refer to FIG. 2, the display device provided by an embodiment of the present application further includes a voltage conversion module 400, where a control terminal of the voltage conversion module 400 is connected to the dimming controller 200, a direct current side of the voltage conversion module 400 is connected to a common power supply terminal Com, and power supply terminals of all the light-emitting units 120 are connected to the common power supply terminal Com, and the voltage conversion module 400 is configured to adjust voltages of the power supply terminals of all the light-emitting units 120 according to an instruction from the dimming controller 200, so as to realize reduction of power consumption of the display device without affecting a back light intensity. The voltage conversion module 400 may be an alternating current-direct current power supply (AC-DC) converter or a direct current-direct current (DC-DC) converter. When the voltage conversion module is an AC-DC converter, an alternating current side of the voltage conversion module is connected to an alternating current power supply. When the voltage converter module is a DC-DC converter, the other direct current side of the voltage converter module is connected to a direct current power supply.

The embodiments of the present application provide a control method, a controller, and a display device, aiming to reduce the power consumption of the display device without affecting picture display. Technical concepts of the present application are: when a drive unit controls a light-emitting unit to emit light, voltage drop on the light-emitting unit will change as temperature rises and displayed pictures become different, which will make a voltage of an output channel of the drive unit also changes, while if the voltage of the output channel of the drive unit is too low, an normal operation of the drive unit will be affected; and if the voltage of the output channel of the drive unit is too high, power loss will be increased. Based on the above analyzing process, a dimming controller reads voltage states of respective output channels of any number of drive units, a control strategy of power supply terminals of light-emitting units is decided by the voltage states of the respective output channels, and the voltages of the power supply terminals of the light-emitting units are adjusted in order to reduce power consumption and ensure an effect of picture display.

Figure 3:
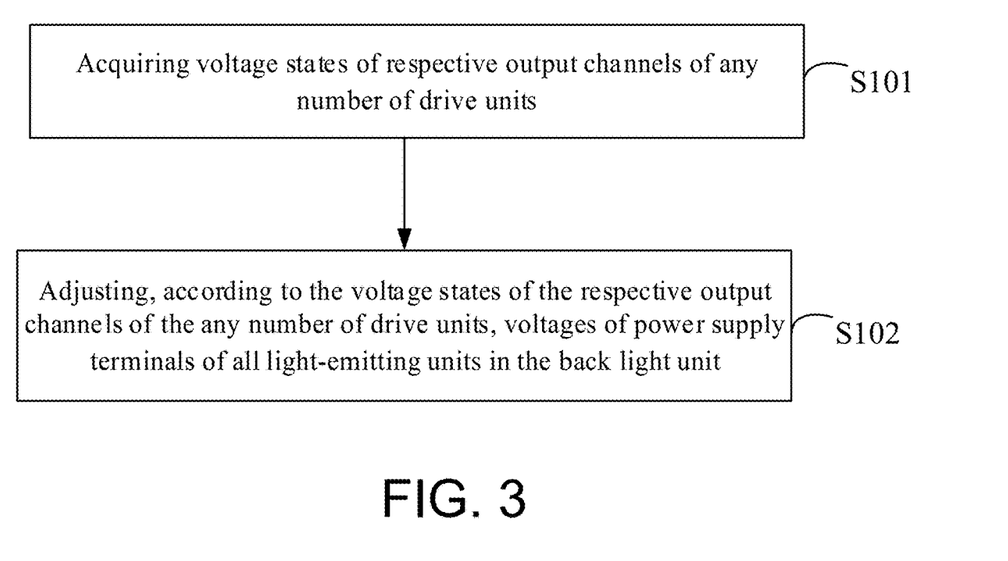
FIG. 3 is a flow diagram of a control method provided by an embodiment of the present application.

As shown in FIG. 3, an embodiment of the present application provides a control method running on a dimming controller, and the control method includes the following steps.

S101, acquiring voltage states of respective output channels of any number of drive units.

In this step, the display device includes a back light unit, where the back light unit includes any number of modules, each module includes a plurality of drive units and a plurality of light-emitting units, a drive unit is provided with a plurality of output channels, and one output channel of the drive unit is connected to a control terminal of one light-emitting unit.

The drive unit saves voltages of respective output channels thereof within preset time at a preset sampling frequency. A shortest duration of the preset time is the shortest time required for the drive unit to acquire voltages of the plurality of output channels thereof, and a longest duration of the preset time is determined according to minimum allowable change time of a voltage of a power supply terminal of a light-emitting unit, the minimum allowable change time being used for ensuring that the a displayed picture does not jitter.

The voltage states of the output channels of each drive unit are determined by the drive unit according to the voltages of the output channels within the preset time and a steady operation voltage range. The steady operation voltage range is set according to an application requirement. After obtaining the steady operation voltage range, the voltage of each output channel of the drive unit is compared with the steady operation voltage range to obtain the voltage state of each output channel of the drive unit.

Figure 4:
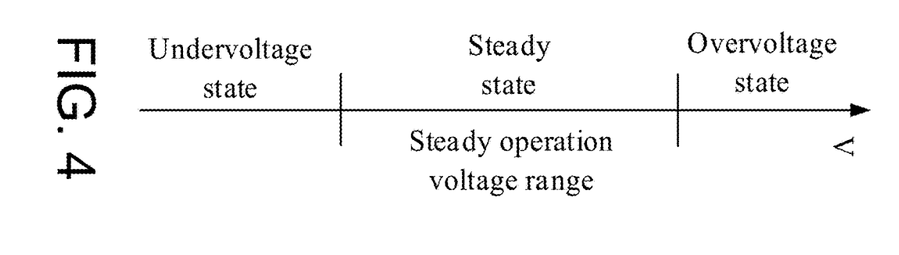
FIG. 4 is a principle diagram of a voltage state of an output channel provided in another embodiment of the present application.

The voltage states include an undervoltage state, an overvoltage state, and a steady state. As shown in FIG. 4, for each output channel, when a voltage of an output channel is greater than an upper boundary of the steady operation voltage range, the output channel is in an overvoltage state. When the voltage of the output channel is less than a lower boundary of the steady operation voltage range, the output channel is in an undervoltage state. When the voltage of the output channel is within the steady operation voltage range, the output channel is in a steady state.

It should be noted that the dimming controller may obtain voltage states of output channels of all the drive units in the BLU, or may obtain voltage states of output channels of drive units located on a certain row or multiple rows, or may obtain voltage states of output channels of drive units located on a certain column or multiple columns, or may obtain voltage states of output channels of drive units located in a certain area.

S102, adjusting, according to the voltage states of the respective output channels of the any number of drive units, voltages of power supply terminals of all light-emitting units in the back light unit.

In this step, after acquiring the aforementioned voltage states of the respective output channels of the any number of drive units, a voltage state of the back light unit is determined by performing statistical analysis on the voltage states of the respective output channels of the any number of drive units. Further, during the statistical analysis, a priority of each voltage state may also be considered to improve a display effect while reducing the power loss of the display device.

For example: when voltage states of most output channels are an undervoltage state, it is determined that the back light unit is in an undervoltage state, and it is necessary to increase the voltages of the power supply terminals of all the light-emitting units. When the voltage states of most output channels are an overvoltage state, it is determined that the back light unit is in an overvoltage state, and it is necessary to reduce the voltages of the power supply terminals of all the light-emitting units. When the voltage states of most output channels are a steady state, it is determined that the back light unit is in a steady state, and it is necessary to hold the voltages of the power supply terminals of all the light-emitting units.

In an embodiment, the power supply terminals of the light-emitting units are connected to a common power supply terminal Com, and the dimming controller, after determining the voltage state of the back light unit, only needs to adjust a voltage of the common power supply terminal Com to realize unified adjustment of the voltages of the power supply terminals of the light-emitting units.

In the above technical solution, the drive unit determines the voltage states of the respective output channels based on the steady operation voltage range and the voltages of the output channels, the dimming controller acquires the voltage states of the output channels of the any number of drive units and adjusts the voltages of the power supply terminals of all light-emitting units based on the voltage states of the respective output channels, and adjusting the voltages of the power supply terminals of the light-emitting units reduces power consumption of the back lighting unit and ensures an effect of picture display.

Figure 5:
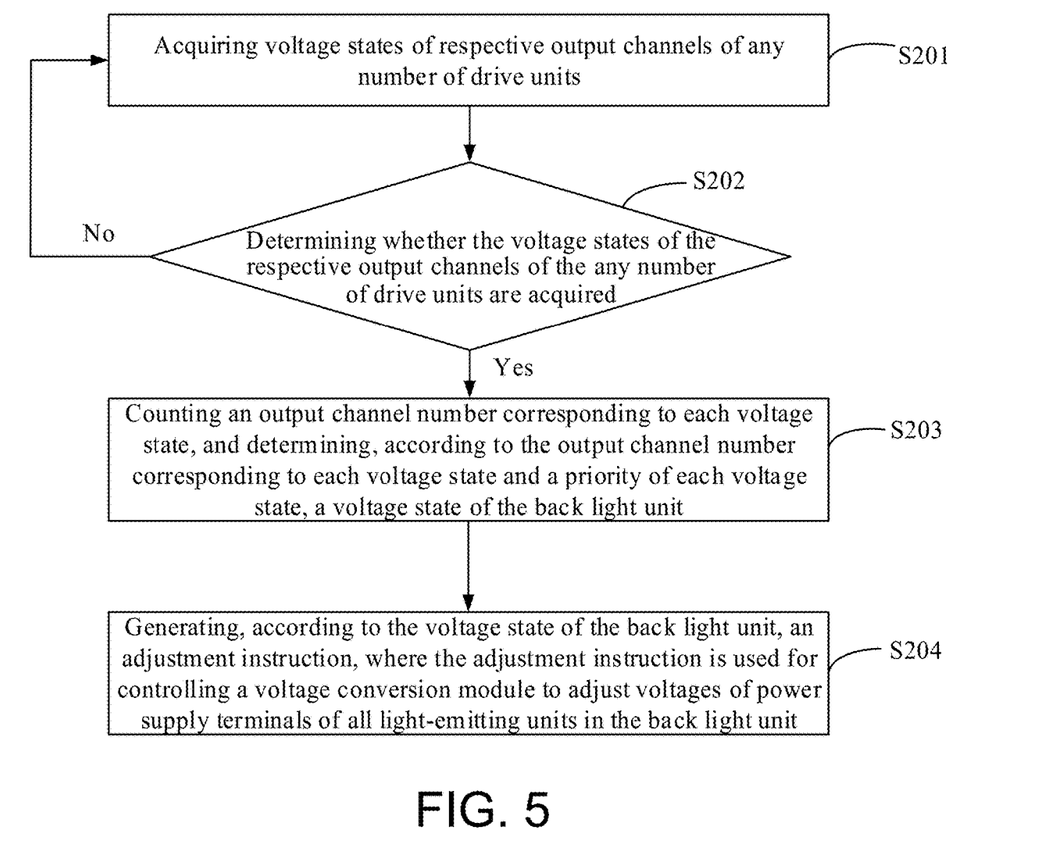
FIG. 5 is a flow diagram of a control method provided by an embodiment of the present application.

As shown in FIG. 5, another embodiment of the present application provides a control method including the following steps.

S201, acquiring voltage states of respective output channels of any number of drive units.

In this step, the voltage states include an undervoltage state, an overvoltage state, and a stable state, and the drive unit collects voltages of output channels thereof within preset time and compares the voltage of each output channel with a steady operation voltage range to obtain the voltage state of each output channel.

S202, determining whether the voltage states of the respective output channels of the any number of drive units are acquired, if so, proceeding to S203, and if not, proceeding to S201.

When a BLU includes M×N drive units, each drive unit including L output channels, only voltage states of respective output channels of P drive units therein are acquired, and whether voltage states of P×L output channels are acquired is determined, where each of M, N, L, and P is a positive integer, and P<M×N.

S203, counting an output channel number corresponding to each voltage state, and determining, according to the output channel number corresponding to each voltage state and a priority of each voltage state, a voltage state of the back light unit.

In this step, the counting the output channel number corresponding to each voltage state refers to counting a number of an output channel in the overvoltage state, counting a number of an output channel in the undervoltage state, and counting a number of an output channel in the steady state.

In an embodiment, after the output channel numbers corresponding to respective voltage states are counted, a voltage state with a maximum output channel number is determined, and when there is only one voltage state corresponding to which the output channel number is maximum, the voltage state with the maximum output channel number is used as the voltage state of the back light unit. When there is a plurality of voltage states corresponding to which the output channel numbers are maximum, a voltage state with a higher priority is selected from the plurality of voltage states with the maximum output channel number as the voltage state of the back light unit.

In an embodiment, critical conditions of respective voltage states are stored locally, and the critical conditions corresponding to the respective voltage states may be different or the same. A voltage state corresponding to which an output channel number satisfies a critical condition is selected from the voltage states as an alternative voltage state, and an alternative voltage state with a highest priority is used as the voltage state of the back light unit.

A critical condition of a certain voltage state specifically includes whether an output channel number corresponding to the voltage state is greater than a preset number threshold. When greater than the preset number threshold, it is indicated that the output channel number corresponding to the voltage state satisfies the critical condition. When less than or equal to the preset number threshold, it is indicated that the output channel number corresponding to the voltage state does not satisfy the critical condition.

S204, generating, according to the voltage state of the back light unit, an adjustment instruction, where the adjustment instruction is used for controlling a voltage conversion module to adjust the voltages of the power supply terminals of all light-emitting units in the back light unit.

In this step, the power supply terminals of all light-emitting units are connected to a common power supply terminal Com, the display device further includes the voltage conversion module, the voltage conversion module being connected to the common power supply terminal Com, the adjustment instruction is generated according to the voltage state of the back light unit, and the adjustment instruction is used for controlling the voltage conversion module to adjust a voltage of the common power supply terminal Com, to realize adjustment of the voltages of the power supply terminals of all the light-emitting units in the back light unit.

In an embodiment, a voltage reduction instruction is generated when the voltage state of the back light unit is an overvoltage state. The voltage reduction instruction is used for controlling the voltage conversion module to reduce the voltages of the power supply terminals of all the light-emitting units in the back light unit.

A voltage increase instruction is generated when the voltage state of the back light unit is an undervoltage state. The voltage increase instruction is used for controlling the voltage conversion module to increase the voltages of the power supply terminals of all the light-emitting units in the back light unit.

A holding instruction is generated when the voltage state of the back light unit is a steady state, and the holding instruction is used for controlling the voltage conversion module to hold the voltages of the power supply terminals of all the light-emitting units in the back light unit.

In the above technical solution, by counting the voltage states of the respective output channels of the any number of drive units, obtaining the voltage state of the back light unit based on a counting result and priorities of the voltage states, and then determining a voltage adjustment strategy for the power supply terminals of the light-emitting units based on the voltage state of the back light unit, the voltages of the power supply terminals of the light-emitting units can be adjusted more accurately. Moreover, the voltage conversion module is used to adjust the voltage of the common power supply terminal to realize the adjustment of the power supply terminals of all the light-emitting units, and it is not necessary to adjust the voltages of the power supply terminals of the light-emitting units one by one, thus simplifying a structure of the display device.

A further embodiment of the present application provides a control method running on a dimming controller, the control method including:

S301, acquiring voltage state of respective output channels of any number of drive units.

In this step, for example: a display device is provided with 64×32 drive units, each drive unit is provided with 4 output channels, and each output channel is connected to a column of light-emitting diodes connected in series.

Each drive unit reads voltages of the 4 output channels within preset time and determines voltage states of the 4 output channels according to the steady operation voltage range and the voltages of the 4 output channels.

Minimum preset time is time to be able to acquire the voltages of output channels thereof, and maximum preset time is time when a voltage converter controls voltages of power supply terminals of light-emitting units without affecting display, for example, there is screen jitter.

In this step, a voltage of a first output channel of a certain drive unit acquired at S301 is 0.5V, a voltage of a second output channel is 1.5V, a voltage of a third output channel is 1.5V, a voltage of a fourth output channel is 2V, and a steady operation voltage range is set to [1V, 2V].

For this drive unit, it can be determined that the first output channel is in an undervoltage state, the second output channel and the third output channel are in a steady state, and the fourth output channel is in an overvoltage state.

For any number of drive units in the 64×32 drive units, the above steps for determining voltage states of output channels are executed on the drive units repeatedly.

S302, determining whether the voltage states of the respective output channels of the any number of drive units are acquired, if so, proceeding to S303, and if not, proceeding to S301.

S303, counting an output channel number corresponding to each voltage state, and determining, according to the output channel number corresponding to each voltage state and a priority of each voltage state, a voltage state of the back light unit.

In this step, a dimming controller counts voltage states of respective output channels of the any number of the drive units within preset time, that is, acquires a number of output channels in an undervoltage state, a number of output channels in an overvoltage state, and a number of output channels in a steady state. After obtaining the numbers of output channels corresponding to the three states, the voltage state of the back light unit is determined based on the above numbers.

In an embodiment, among the undervoltage state, the overvoltage state, and the stabilized state, a voltage state in which a maximum number of output channels are is used as a voltage state of the back light unit. If among the three states, two states correspond to which the output channel numbers are maximum, the voltage state of the back light unit is determined according to priorities of the voltage states. For example, if the number of output channels in the undervoltage state and the number of output channels in the steady state are the same and both are greater than the number of output channels in the overvoltage state, and the priority of the undervoltage state is higher than the priority of the steady state, the back light unit is determined to be in the undervoltage state.

In an embodiment, whether the output channel numbers corresponding to the voltage states satisfy a critical condition is determined, and one voltage state is selected as the voltage state of the back light unit from voltage states satisfying the critical condition(s) according to the priorities of the voltage states.

For a voltage state, satisfying the critical condition includes that a number of output channels in the voltage state is greater than a preset threshold value, or, the satisfying the critical condition includes that a ratio between the number of output channels in the voltage state and a total number of all output channels of the display device is greater than a preset ratio value. Critical conditions corresponding to the voltage states are different, for example: when a ratio between the number of output channels in the undervoltage state and the number of all the output channels is greater than 10%, a critical condition for the undervoltage state is satisfied. When a ratio between the number of output channels in the overvoltage state and the number of all the output channels exceeds 20%, a critical condition for the overvoltage state is satisfied.

S304, adjusting, according to the voltage state of the back light unit, voltages of power supply terminals of all light-emitting units in the back light unit.

In this step, after the voltage state of the back light unit is determined, a control signal for a voltage conversion module is generated according to the voltage state of the back light unit to enable the voltage conversion module to adjust the power supply terminals of all the light-emitting units in the back light unit.

When the voltage state of the back light unit is an undervoltage state, a voltage increase instruction is generated to control the voltage conversion module to increase a voltage of a direct current side connected to the power supply terminals of the light-emitting units, thereby adjusting the voltages of the power supply terminals of all the light-emitting units in the back light unit.

When the voltage state of the back light unit is an overvoltage state, a voltage reduction instruction is generated to control the voltage conversion module to reduce the voltage of the direct current side connected to the power supply terminals of the light-emitting units, thereby adjusting the voltages of the power supply terminals of all the light-emitting units in the back light unit.

When the voltage state of the back light unit is a steady state, a holding instruction is generated to control the voltage conversion module to hold the voltage of the direct current side connected to the power supply terminals of the light-emitting units.

In the above technical solution, by acquiring the voltages of the output channels of any number of drive units to determine the current voltage states of respective output channels according to the voltages of respective output channels, and then reading the voltage states of respective output channels from the any number of drive units by the dimming controller, and determining a voltage control strategy of the power supply terminals of the light-emitting units according to the voltage states of the respective output channels, the voltages of the power supply terminals of the light-emitting units are adjusted more accurately.

Figure 6:
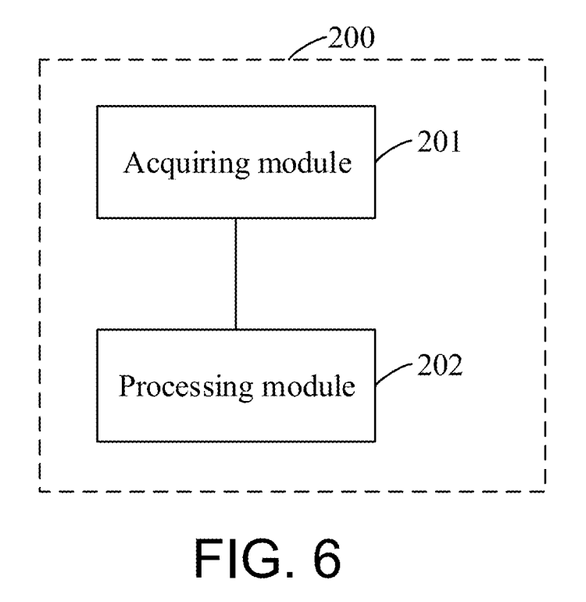
FIG. 6 is a schematic structural diagram of a control apparatus provided in an embodiment of the present application.

As shown in FIG. 6, an embodiment of the present application provides a control apparatus 200, including:

an acquiring module 201, acquiring voltage states of respective output channels of any number of drive units; where the voltage states include an undervoltage state, an overvoltage state, and a steady state; and a voltage state of an output channel of each drive unit is determined by the drive unit according to a voltage of the output channel within preset time and a steady operation voltage range; and a processing module 202, configured to adjust, according to the voltage states of the respective output channels of the any number of drive units, voltages of power supply terminals of all light-emitting units in the back light unit.

In an embodiment, the processing module 202 is specifically configured to:

count an output channel number corresponding to each voltage state, and determine, according to the output channel number corresponding to each voltage state and a priority of each voltage state, a voltage state of the back light unit; and adjust, according to the voltage state of the back light unit, the voltages of the power supply terminals of all the light-emitting units in the back light unit.

In an embodiment, the processing module 202 is specifically configured to:

when an output channel number corresponding to one voltage state is maximum, use the voltage state with the maximum output channel number as the voltage state of the back light unit; and when output channel numbers corresponding to a plurality of voltage states are a maximum output channel number, select a voltage state with a higher priority from the plurality of voltage states with the maximum output channel number as the voltage state of the back light unit;

or select, from the voltage states, a voltage state corresponding to which an output channel number satisfies a critical condition as an alternative voltage state; and use an alternative voltage state with a highest priority as the voltage state of the back light unit.

In an embodiment, the power supply terminals of all the light-emitting units are connected to a common power supply terminal; and the processing module 202 is specifically configured to:

adjust, according to the voltage state of the back light unit, a voltage of the common power supply terminal, to realize adjustment of the voltages of the power supply terminals of all the light-emitting units in the back light unit.

In an embodiment, the display device further includes a voltage conversion module, the voltage conversion module being connected to the common power supply terminal; and the processing module 202 is specifically configured to:

generate, according to the voltage state of the back light unit, an adjustment instruction, where the adjustment instruction is used for controlling the voltage conversion module to adjust the voltage of the common power supply terminal.

In an embodiment, the processing module 202 is specifically configured to:

when the voltage state of the back light unit is an overvoltage state, generate a voltage reduction instruction; the voltage reduction instruction being used for controlling the voltage conversion module to reduce the voltage of the common power supply terminal;

when the voltage state of the back light unit is an undervoltage state, generate a voltage increase instruction; the voltage increase instruction being used for controlling the voltage conversion module to increase the voltage of the common power supply terminal; and when the voltage state of the back light unit is a steady state, generate a holding instruction, where the holding instruction is used for controlling the voltage conversion module to hold the voltage of the common power supply terminal.

In an embodiment, for each output channel, when a voltage of an output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

Figure 7:
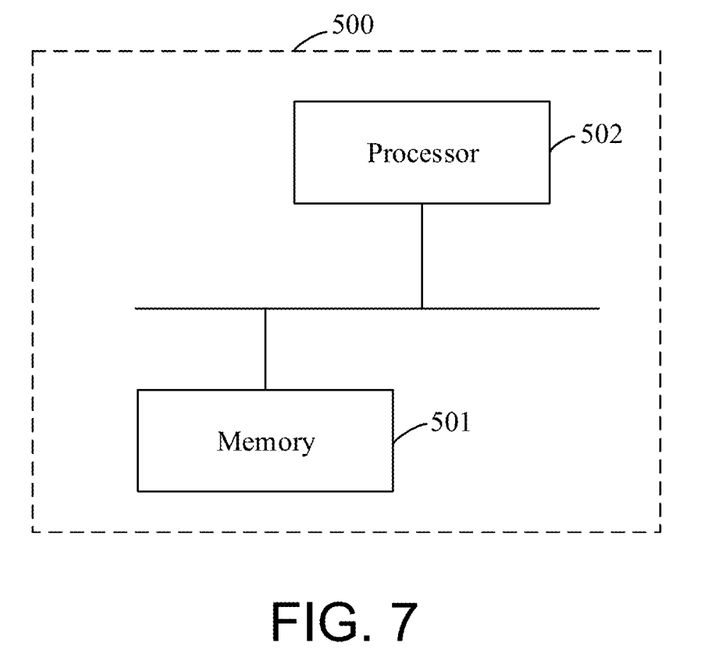
FIG. 7 is a schematic structural diagram of a dimming controller provided in another embodiment of the present application.

As shown in FIG. 7, an embodiment of the present application provides a dimming controller 500, the dimming controller 500 including a memory 501 and a processor 502.

The memory 501 is configured to store a computer instruction executable by the processor 502; and the processor 502 implements various steps in the methods in the aforementioned embodiments when executing the computer instruction. Specific reference may be made to related descriptions in the aforementioned method embodiments.

In one embodiment, the memory 501 may either be independent or integrated with the processor 502. When the memory 501 is provided independently, the dimming controller further includes a bus configured to connect the memory 501 to the processor 502.

An embodiment of the present application further provides a computer readable storage medium storing a computer instruction, when the computer instruction is executed by a processor, various steps in the methods in the aforementioned embodiments are implemented.

An embodiment of the present application further provides a computer program product including a computer instruction, when the computer instruction is executed by a processor, various steps in the methods in the aforementioned embodiments are implemented.

The present application provides a control method, a dimming controller, and a display device. When a drive unit controls a light-emitting unit to emit light, voltage drop on the light-emitting unit changes with the increase of temperature as well as different displayed pictures, which will cause a voltage of an output channel of the drive unit to change. Voltage states of respective output channels of any number of drive units are determined based on a steady operation voltage range and voltages of the respective output channels of the any number of drive units, and voltages of power supply terminals of all light-emitting units in a back light unit are adjusted based on the voltage states of the respective output channels. Adjusting the voltages of the power supply terminals of the light-emitting units can reduce power consumption of the back light unit and ensure an effect of picture display. In addition, there is no need to add sensors to monitor a voltage state of the back light unit, which does not increase thickness of the display device and has a lower cost.

Other embodiments of the present application will be apparent to those skilled in the art from consideration of the specification and practice of the technical solutions disclosed herein. The present application is intended to cover any variation, use, or adaptation of the present application which follow general principles of the present application and include common knowledge or customary technical means in the art which are not disclosed in the present application. The specification and the embodiments are to be regarded as illustrative only, and true scope and spirit of the present application is indicated by following claims.

It should be understood that the present application is not limited to the precise structure which has been described above and illustrated in the drawings, and that various modifications and changes may be made without departing from scope thereof. The scope of the present application is limited only by the appended claims.

What is claimed is:

1. A control method, applied to a dimming controller, wherein a display device comprises the dimming controller and a back light unit; each back light unit comprises any number of modules, each module comprises a plurality of drive units and a plurality of light-emitting units, one output channel of each of the drive units is connected to a control terminal of one light-emitting unit, and the method comprises:

acquiring voltage states of respective output channels of any number of drive units; wherein the voltage states comprise an undervoltage state, an overvoltage state, and a steady state; and a voltage state of an output channel of a drive unit is determined by the drive unit according to a voltage of the output channel within preset time and a steady operation voltage range; and adjusting, according to the voltage states of the respective output channels of the any number of drive units, voltages of power supply terminals of all light-emitting units in the back light unit.

2. The control method according to claim 1, wherein the adjusting, according to the voltage states of the respective output channels of the any number of drive units, the voltages of the power supply terminals of all the light-emitting units in the back light unit specifically comprises:

counting an output channel number corresponding to each voltage state, and determining, according to the output channel number corresponding to each voltage state and a priority of each voltage state, a voltage state of the back light unit; and adjusting, according to the voltage state of the back light unit, the voltages of the power supply terminals of all the light-emitting units in the back light unit.

3. The control method according to claim 2, wherein the determining, according to the output channel number corresponding to each voltage state and the priority of each voltage state, the voltage state of the back light unit specifically comprises any one of the following:

when an output channel number corresponding to one voltage state is maximum, using the voltage state with the maximum output channel number as the voltage state of the back light unit; and when output channel numbers corresponding to a plurality of voltage states are a maximum output channel number, selecting a voltage state with a higher priority from the plurality of voltage states with the maximum output channel number as the voltage state of the back light unit; and selecting, from the voltage states, a voltage state corresponding to which an output channel number satisfies a critical condition as an alternative voltage state; and using an alternative voltage state with a highest priority as the voltage state of the back light unit.

4. The control method according to claim 3, wherein:

for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

5. The control method according to claim 2, wherein the power supply terminals of all the light-emitting units are connected to a common power supply terminal; and the adjusting, according to the voltage state of the back light unit, the voltages of the power supply terminals of all the light-emitting units in the back light unit specifically comprises:

adjusting, according to the voltage state of the back light unit, a voltage of the common power supply terminal, to realize adjustment of the voltages of the power supply terminals of all the light-emitting units in the back light unit.

6. The control method according to claim 5, wherein the display device further comprises a voltage conversion module, the voltage conversion module being connected to the common power supply terminal; and the adjusting, according to the voltage state of the back light unit, the voltage of the common power supply terminal specifically comprises:

generating, according to the voltage state of the back light unit, an adjustment instruction, wherein the adjustment instruction is used for controlling the voltage conversion module to adjust the voltage of the common power supply terminal.

7. The control method according to claim 6, wherein the generating, according to the voltage state of the back light unit, the adjustment instruction, specifically comprises:

when the voltage state of the back light unit is an overvoltage state, generating a voltage reduction instruction; the voltage reduction instruction being used for controlling the voltage conversion module to reduce the voltage of the common power supply terminal;

when the voltage state of the back light unit is an undervoltage state, generating a voltage increase instruction; the voltage increase instruction being used for controlling the voltage conversion module to increase the voltage of the common power supply terminal; and when the voltage state of the back light unit is a steady state, generating a holding instruction, wherein the holding instruction is used for controlling the voltage conversion module to hold the voltage of the common power supply terminal.

8. The control method according to claim 6, wherein:

for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

9. The control method according to claim 5, wherein:

for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

10. The control method according to claim 2, wherein:

for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

11. The control method according to claim 1, wherein:

for each output channel, when a voltage of the output channel is greater than an upper boundary of the steady operation voltage range, the output channel is in the overvoltage state;

when the voltage of the output channel is less than a lower boundary of the steady operation voltage range, the output channel is in the undervoltage state; and when the voltage of the output channel is within the steady operation voltage range, the output channel is in the steady state.

12. A dimming controller, comprising: a processor, and a memory communicatively connected to the processor; wherein a display device comprises the dimming controller and a back light unit; each back light unit comprises any number of modules, each module comprises a plurality of drive units and a plurality of light-emitting units, one output channel of each of the drive units is connected to a control terminal of one light-emitting unit;
- wherein the memory stores a computer executable instruction; and
- the processor executes the computer executable instruction stored in the memory to cause the processor to:
- acquire voltage states of respective output channels of any number of drive units; wherein the voltage states comprise an undervoltage state, an overvoltage state, and a steady state; and a voltage state of an output channel of a drive unit is determined by the drive unit according to a voltage of the output channel within preset time and a steady operation voltage range; and
- adjust, according to the voltage states of the respective output channels of the any number of drive units, voltages of power supply terminals of all light-emitting units in the back light unit.

13. The dimming controller according to claim 12, wherein the processor is further caused to:
- count an output channel number corresponding to each voltage state, and determine, according to the output channel number corresponding to each voltage state and a priority of each voltage state, a voltage state of the back light unit; and
- adjust, according to the voltage state of the back light unit, the voltages of the power supply terminals of all the light-emitting units in the back light unit.

14. The dimming controller according to claim 13, wherein the processor is further caused to perform at least one of the following:
- when an output channel number corresponding to one voltage state is maximum, using the voltage state with the maximum output channel number as the voltage state of the back light unit; and
- when output channel numbers corresponding to a plurality of voltage states are a maximum output channel number, selecting a voltage state with a higher priority from the plurality of voltage states with the maximum output channel number as the voltage state of the back light unit; and
- selecting, from the voltage states, a voltage state corresponding to which an output channel number satisfies a critical condition as an alternative voltage state; and using an alternative voltage state with a highest priority as the voltage state of the back light unit.

15. The dimming controller according to claim 13, wherein the power supply terminals of all the light-emitting units are connected to a common power supply terminal; and the processor is further caused to:
- adjust, according to the voltage state of the back light unit, a voltage of the common power supply terminal, to realize adjustment of the voltages of the power supply terminals of all the light-emitting units in the back light unit.

16. The dimming controller according to claim 15, wherein the display device further comprises a voltage conversion module, the voltage conversion module being connected to the common power supply terminal; and the processor is further caused to:
- generate, according to the voltage state of the back light unit, an adjustment instruction, wherein the adjustment instruction is used for controlling the voltage conversion module to adjust the voltage of the common power supply terminal.

17. The dimming controller according to claim 16, wherein the processor is further caused to:
- when the voltage state of the back light unit is an overvoltage state, generate a voltage reduction instruction; the voltage reduction instruction being used for controlling the voltage conversion module to reduce the voltage of the common power supply terminal;
- when the voltage state of the back light unit is an undervoltage state, generate a voltage increase instruction; the voltage increase instruction being used for controlling the voltage conversion module to increase the voltage of the common power supply terminal; and
- when the voltage state of the back light unit is a steady state, generate a holding instruction, wherein the holding instruction is used for controlling the voltage conversion module to hold the voltage of the common power supply terminal.

18. The dimming controller according to claim 12, wherein:
- for each output channel, when a voltage of the output channel is greater than an upper boundary of the steady operation voltage range, the output channel is in the overvoltage state;
- when the voltage of the output channel is less than a lower boundary of the steady operation voltage range, the output channel is in the undervoltage state; and
- when the voltage of the output channel is within the steady operation voltage range, the output channel is in the steady state.

19. A display device, comprising a dimming controller and a back light unit; wherein each back light unit comprises any number of modules, each module comprises a plurality of drive units and a plurality of light-emitting units, one output channel of each of the drive units is connected to a control terminal of one light-emitting unit; and each of the drive units is further connected to the dimming controller, wherein the dimming controller comprises: a processor, and a memory communicatively connected to the processor,
- wherein the memory stores a computer executable instruction; and
- the processor executes the computer executable instruction stored in the memory to cause the processor to:
- acquire voltage states of respective output channels of any number of drive units; wherein the voltage states comprise an undervoltage state, an overvoltage state, and a steady state; and a voltage state of an output channel of a drive unit is determined by the drive unit according to a voltage of the output channel within preset time and a steady operation voltage range; and
- adjust, according to the voltage states of the respective output channels of the any number of drive units, voltages of power supply terminals of all light-emitting units in the back light unit.

20. The display device according to claim 19, wherein the display device further comprises a voltage conversion module, the voltage conversion module being connected to the dimming controller, and the voltage conversion module being further connected to a common power supply terminal, and power supply terminals of all the light-emitting units are connected to the common power supply terminal.

* * * * *